United States Patent
Horibata et al.

(10) Patent No.: US 12,042,727 B2
(45) Date of Patent: Jul. 23, 2024

(54) IMAGE PROCESSING METHOD, IMAGE PROCESSING DEVICE, GAME DEVICE, AND PROGRAM FOR CONVERTING COLOR INFORMATION ON A PER-PIXEL BASIS AND BASED ON A MODULATION FILTER

(71) Applicant: CYGAMES, INC., Tokyo (JP)

(72) Inventors: Akira Horibata, Tokyo (JP); Kensaku Fujita, Tokyo (JP); Sotaro Hori, Tokyo (JP)

(73) Assignee: CYGAMES, INC., Tokyo (JP)

( * ) Notice: Subject to any disclaimer, the term of this patent is extended or adjusted under 35 U.S.C. 154(b) by 413 days.

(21) Appl. No.: 17/357,133

(22) Filed: Jun. 24, 2021

(65) Prior Publication Data

US 2021/0316217 A1    Oct. 14, 2021

Related U.S. Application Data

(63) Continuation of application No. PCT/JP2019/050652, filed on Dec. 24, 2019.

(30) Foreign Application Priority Data

Dec. 25, 2018 (JP) ................. 2018-241536

(51) Int. Cl.
*A63F 13/52* (2014.01)
*G06T 7/50* (2017.01)
(Continued)

(52) U.S. Cl.
CPC ............. *A63F 13/52* (2014.09); *G06T 7/50* (2017.01); *G06T 7/62* (2017.01); *G06T 7/90* (2017.01);
(Continued)

(58) Field of Classification Search
CPC ... A63F 13/52; G06T 7/62; G06T 7/50; G06T 7/90; G06T 15/02; G06T 15/20; G06T 2207/10024
See application file for complete search history.

(56) References Cited

U.S. PATENT DOCUMENTS

| | | | | |
|---|---|---|---|---|
| 2002/0113789 A1* | 8/2002 | Sotoike | ................... | G06T 15/80 345/426 |
| 2002/0177481 A1* | 11/2002 | Kitsutaka | ................ | G06T 15/20 463/30 |
| 2020/0099905 A1* | 3/2020 | Post | ..................... | H04N 9/3194 |

FOREIGN PATENT DOCUMENTS

| | | |
|---|---|---|
| JP | S63259778 A | 10/1988 |
| JP | 2006318386 A | 11/2006 |

(Continued)

OTHER PUBLICATIONS

International Search Report issued in International Application No. PCT/JP2019/050652, mailed Mar. 10, 2020 (5 pages).

(Continued)

*Primary Examiner* — David L Lewis
*Assistant Examiner* — Shauna-Kay Hall
(74) *Attorney, Agent, or Firm* — Osha Bergman Watanabe & Burton LLP

(57) ABSTRACT

The present invention provides an image processing method, wherein a computer executes: an acquisition step S10 of acquiring image information indicating, on a per-pixel basis, distance information indicating the distance from a camera and color information; a determination step S20 of determining, on a per-pixel basis and on the basis of the distance information of individual pixels, settings of a modulation filter that converts the color information of the individual pixels to modulate an image into the style of a painting; and a conversion step S30 of converting the color information on (Continued)

a per-pixel basis on the basis of the settings of the modulation filter determined for the individual pixels.

8 Claims, 8 Drawing Sheets

(51) Int. Cl.
  *G06T 7/62* (2017.01)
  *G06T 7/90* (2017.01)
  *G06T 15/02* (2011.01)
  *G06T 15/20* (2011.01)
(52) U.S. Cl.
  CPC .............. *G06T 15/02* (2013.01); *G06T 15/20* (2013.01); *G06T 2207/10024* (2013.01)

(56) References Cited

FOREIGN PATENT DOCUMENTS

| | | | |
|---|---|---|---|
| JP | 2006318389 A | 11/2006 |
| JP | 2007272356 A | 10/2007 |

OTHER PUBLICATIONS

Written Opinion issued in International Application No. PCT/JP2019/050652; Dated Mar. 10, 2020 (3 pages).
Reconsideration Report issued in Japanese Application No. 2018-241536; Dated Feb. 8, 2024 (5 pages).

* cited by examiner

FIG. 4

REFERENCE AREA INFORMATION

| LEVEL | DISTANCE RANGE | THRESHOLD | FORMULA |
|---|---|---|---|
| 1 | RANGE (1) | 9 | L=(THRESHOLD) |
| 2 | RANGE (2) | 1 | $L=f_1(d)$ |
| 3 | RANGE (3) | 1 | L=(THRESHOLD) |
| 4 | RANGE (4) | 25 | $L=f_2(d)$ |
| 5 | RANGE (5) | 25 | L=(THRESHOLD) |

IMAGE PROCESSING METHOD, IMAGE PROCESSING DEVICE, GAME DEVICE, AND PROGRAM FOR CONVERTING COLOR INFORMATION ON A PER-PIXEL BASIS AND BASED ON A MODULATION FILTER

TECHNICAL FIELD

The present invention relates to image processing methods, image processing devices, game devices, and programs.

BACKGROUND ART

As modulation filters for modulating an image into the style of a painting, the symmetric nearest neighbor (SNN) filter, the median filter, the Kuwahara filter, etc. are well known. These modulation filters modulate an entire image into the style of a painting by converting color information of each pixel on the basis of color information of other pixels (e.g., other pixels around that pixel).

Patent Literatures 1 and 2 disclose technologies for generating an image in which fog (fog, cloud, steam, haze, dirt, dust, smoke, tornado, dew, etc.) is applied to an original image, wherein an a value, which is a parameter for controlling the fog density in accordance with the distance from the viewpoint (virtual camera), is changed so as to increase the fog density as the distance from the viewpoint increases.

CITATION LIST

Patent Literature

PTL 1
Japanese Unexamined Patent Application, Publication No. 2006-318386
PTL 2
Japanese Unexamined Patent Application, Publication No. 2006-318389

SUMMARY OF INVENTION

Technical Problem

In the above-described ordinary processing for modulating an image into the style of a painting by using a modulation filter, color information of all pixels is converted uniformly by the same degree (e.g., the degree of blurring or the degree of bleeding). The adjustment of the degree is realized, for example, by adjusting the number of other pixels, the weights of color information of other pixels, etc. that are referred to when converting color information.

In the case of the above-described ordinary processing, although it is possible to generate an image that is painting-like in its entirety, it is not possible to generate an image in which both edge clarity and painting-like qualities of predetermined content to be rendered are realized. Patent Literatures 1 and 2 do not disclose or suggest this problem to be addressed or a solution therefor concerning a modulation filter that modulates an image into the style of a painting.

It is an object of the present invention to render an image while realizing both edge clarity and painting-like qualities of predetermined content to be rendered.

Solution to Problem

The present invention provides an image processing method, wherein a computer executes:
an acquisition step of acquiring image information indicating, on a per-pixel basis, distance information indicating the distance from a camera and color information;
a determination step of determining, on a per-pixel basis and on the basis of the distance information of individual pixels, settings of a modulation filter that converts the color information of the individual pixels to modulate an image into the style of a painting; and
a conversion step of converting the color information on a per-pixel basis on the basis of the settings of the modulation filter determined for the individual pixels.

The present invention provides an image processing device including:
an acquisition unit that acquires image information indicating, on a per-pixel basis, distance information indicating the distance from a camera and color information;
a determination unit that determines, on a per-pixel basis and on the basis of the distance information of individual pixels, settings of a modulation filter that converts the color information of the individual pixels to modulate an image into the style of a painting; and
a conversion unit that converts the color information on a per-pixel basis on the basis of the settings of the modulation filter determined for the individual pixels.

The present invention provides a program for causing a computer to function as:
an acquisition means for acquiring image information indicating, on a per-pixel basis, distance information indicating the distance from a camera and color information;
a determination means for determining, on a per-pixel basis and on the basis of the distance information of individual pixels, settings of a modulation filter that converts the color information of the individual pixels to modulate an image into the style of a painting; and
a conversion means for converting the color information on a per-pixel basis on the basis of the settings of the modulation filter determined for the individual pixels.

The present invention provides a game device including:
an input accepting unit that accepts an operational input from a player;
a player-character control unit that manages the position and orientation of a player character in a virtual three-dimensional space;
a non-player-character control unit that manages the position and orientation of a non-player character in the virtual three-dimensional space;
a camera control unit that manages the position and orientation of a virtual camera in the virtual three-dimensional space;
a rendering unit that renders the virtual three-dimensional space captured by the virtual camera as an image on a two-dimensional plane on the basis of the positions and orientations of the player character, the non-player character, and the virtual camera in the virtual three-dimensional space; and
a display control unit that causes an output device to display the image on the two-dimensional plane,
wherein the rendering unit includes:
an acquisition unit that acquires image information indicating, on a per-pixel basis, distance information indicating the distance from the virtual camera and color information;
a determination unit that determines, on a per-pixel basis and on the basis of the distance information of individual pixels, settings of a modulation filter that converts the color information of the individual pixels to modulate an image into the style of a painting; and a conversion unit that converts the color information on a per-pixel basis on the basis of the settings of the modulation filter determined for the individual pixels.

Advantageous Effects of Invention

The present invention makes it possible to render an image while realizing both edge clarity and painting-like qualities of predetermined content to be rendered.

BRIEF DESCRIPTION OF DRAWINGS

The abovementioned object, other objects, features and advantages will become more apparent in view of preferred embodiments described below and the following accompanying drawings.

FIG. 4 schematically shows an example of reference area information according to the present embodiment.

DESCRIPTION OF EMBODIMENTS

First Embodiment

First, an overview of processing by an image processing device according to this embodiment will be described. In the image processing device according to this embodiment, upon acquiring image information indicating "distance information indicating the distance from a camera" and "color information" on a per-pixel basis, the settings of "a modulation filter that converts the color information of individual pixels to modulate an image into the style of a painting" are determined on a per-pixel basis on the basis of the distance information of the individual pixels. The settings that are determined here are the degrees of conversion (e.g., the degrees of blurring or the degrees of bleeding) of the color information of the individual pixels. The degrees of modulation of the image are adjusted by adjusting the settings. Furthermore, the image processing device converts the color information on a per-pixel basis on the basis of the settings of the modulation filter determined for the individual pixels.

As described above, with the image processing device according to this embodiment, it is possible to set the degrees of conversion (e.g., the degrees of blurring or the degrees of bleeding) of the color information of individual pixels on a per-pixel basis and to convert the color information of the individual pixels as set on a per-pixel basis. Thus, with the image processing device according to this embodiment, it is possible to vary the degrees of conversion partially within a single image. That is, with the image processing device according to this embodiment, it is possible to generate a single image in which a portion with a high degree of conversion, a portion with a low degree of conversion, a portion that has not been converted, etc. coexist. Accordingly, with the image processing device according to this embodiment, it becomes possible to modulate an image into the style of a painting while realizing both edge clarity and painting-like qualities of predetermined content to be rendered.

Next, the configuration of the image processing device according to this embodiment will be described. First, an example hardware configuration of the image processing device will be described. The functional units provided in the image processing device according to this embodiment are realized by an arbitrary combination of hardware and software mainly including an arbitrary computer having a central processing unit (CPU), a memory, programs loaded into the memory, a storage unit that stores the programs (which can store programs already stored at the time of shipping of the device as well as programs stored in a storage medium, such as a compact disc (CD), or downloaded from a server or the like on the Internet), such as a hard disk, and a network connection interface. Furthermore, it would be understood by a person skilled in the art that there are various modifications concerning the method of realization and the device.

Figure 1:
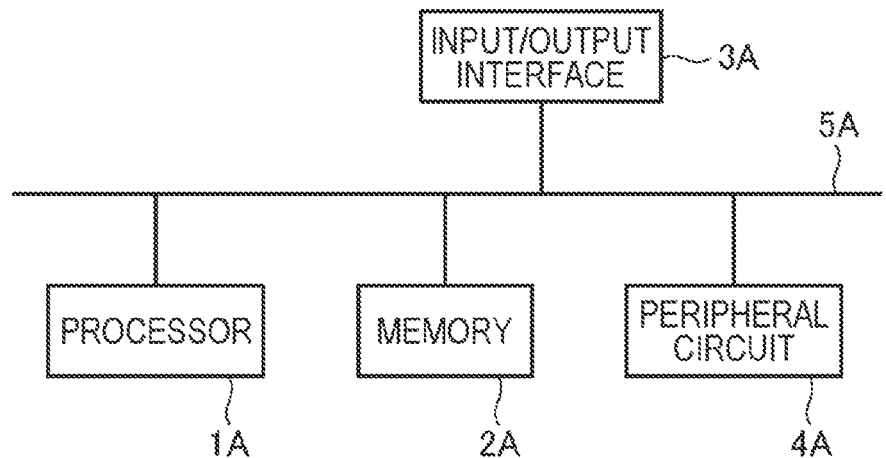
FIG. 1 is a diagram showing an example hardware configuration of an image processing device according to the present embodiment.

FIG. 1 is a block diagram showing an example hardware configuration of the image processing device according to this embodiment. As shown in FIG. 1, the image processing device includes a processor 1A, a memory 2A, an input/output interface 3A, a peripheral circuit 4A, and a bus 5A. The peripheral circuit 4A includes various modules. The image processing device need not include the peripheral circuit 4A. Note that the image processing device may be configured of a plurality of physically and/or logically separated devices. In this case, each of the plurality of devices may include the hardware configuration described above.

The bus 5A is a data transmission path that allows the processor 1A, the memory 2A, the peripheral circuit 4A, and the input/output interface 3A to mutually send and receive data. The processor 1A is a computational processing device, such as a CPU or a graphics processing unit (GPU). The memory 2A is a memory such as a random access memory (RAM) or a read only memory (ROM). The input/output interface 3A includes an interface for obtaining information from an input device, an external device, an external server, an external sensor, etc., an interface for outputting information to an output device, an external device, an external server, etc., and so forth. The input device is, for example, a controller, a keyboard, a mouse, a microphone, a pointing device, a touchscreen, a physical button, or a camera. The output device is, for example, a display, a speaker, a printer, or a mailer. The processor 1A can issue instructions to the individual modules and can perform computations on the basis of the results of corresponding computations.

Figure 2:
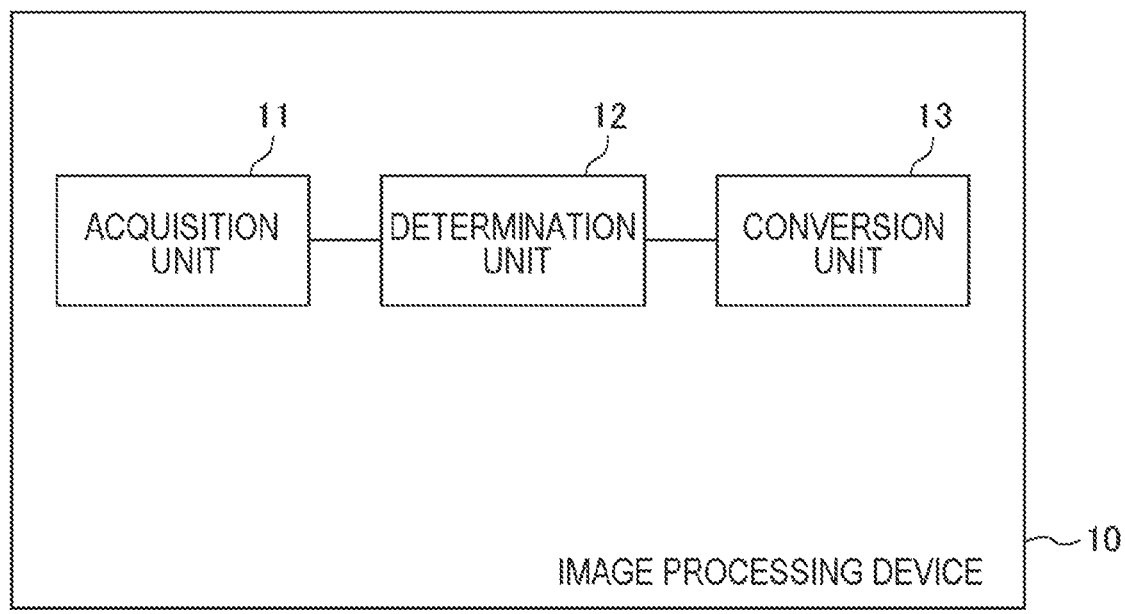
FIG. 2 is an example functional block diagram of the image processing device according to the present embodiment.

Next, the functional configuration of the image processing device according to this embodiment will be described. FIG. 2 shows an example functional block diagram of an image processing device 10. As shown in the figure, the image processing device 10 includes an acquisition unit 11, a determination unit 12, and a conversion unit 13.

The acquisition unit 11 acquires image information, which is information concerning an image and indicates color information and distance information on a per-pixel basis.

The image is, for example, an image indicating a scene in a game. More specifically, the image is obtained by capturing an image of (photographing) a plurality of items to be rendered, whose position information in a three-dimensional space is managed, from a virtual camera set at a predetermined viewpoint and subjecting the image to two-dimensional perspective projection. Examples of the items to be rendered include characters that appear in the game and objects constituting parts of the background (plants such as trees, structures such as houses, etc.), but there is no limitation to these examples. As the method of hidden surface removal at the time of rendering a two-dimensional image, for example, depth buffering (Z-buffering) is used.

The color information indicates the colors of the items to be rendered represented by the individual pixels. The distance information indicates the distances from the camera (viewpoint) to the items to be rendered represented by the individual pixels.

The determination unit 12 determines the settings of a modulation filter that converts the color information of individual pixels to modulate an image into the style of a painting (hereinafter simply referred to as a "modulation filter" depending on the case) on a per-pixel basis on the basis of the distance information of the individual pixels.

The modulation filter is a filter that converts an image into the style of a painting by converting the color information of each pixel on the basis of the color information of the other pixels. Examples of the modulation filter include the symmetric nearest neighbor (SNN) filter, the median filter, and the Kuwahara filter, but there is no limitation to these examples.

Figure 3:
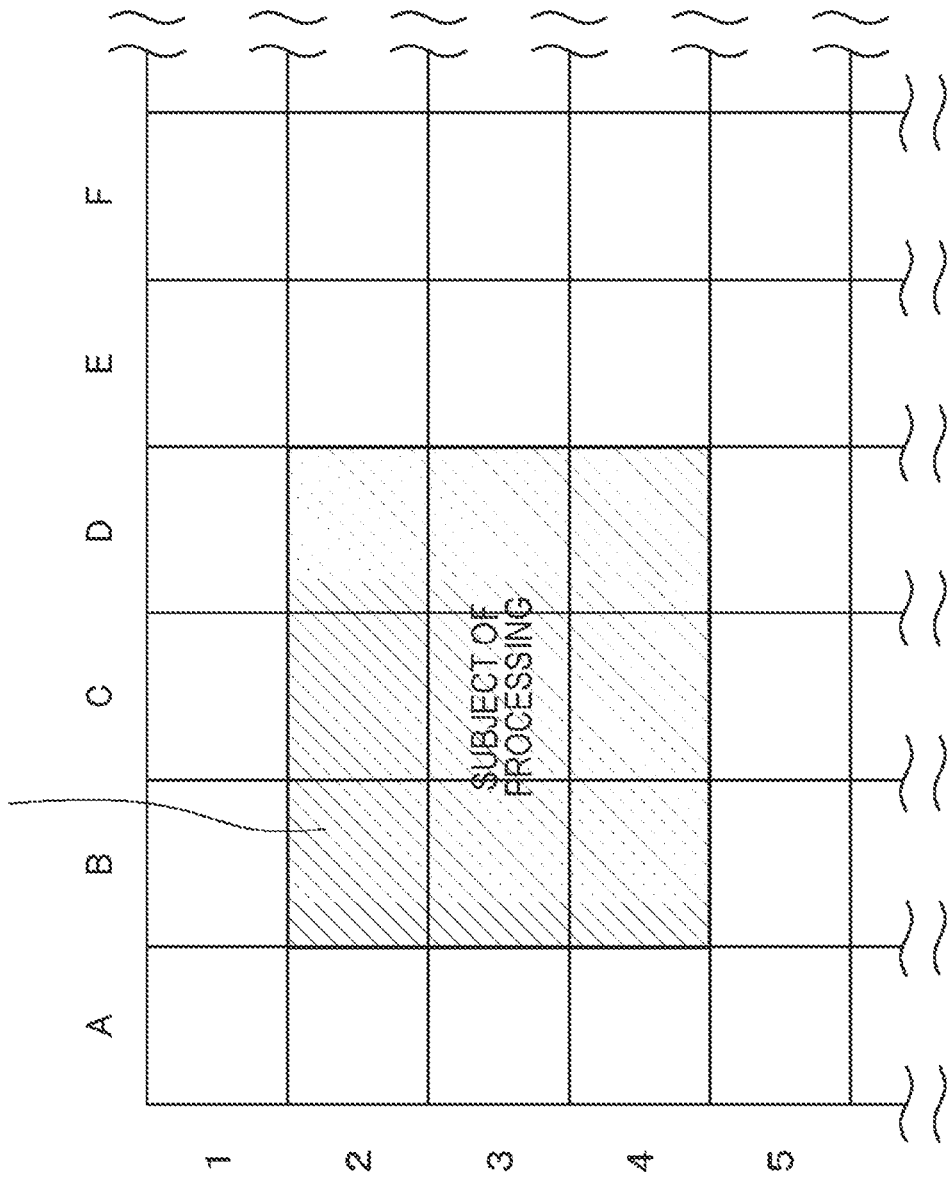
FIG. 3 explains conversion processing according to the present embodiment.

An overview of processing using the modulation filter will be described with reference to FIG. 3. FIG. 3 shows a plurality of pixels. Here, the individual pixels are identified by using numerals assigned to the individual rows and letters assigned to the individual columns. For example, the pixel located on the row to which 1 is assigned and on the column to which B is assigned will be referred to as a pixel 1B.

In the processing using the modulation filter, a reference area is set so as to include a pixel being subjected to processing. The reference area may include either just the pixel being subjected to processing or the pixel being subjected to processing as well as other pixels (e.g., pixels located around the pixel being subjected to processing). In the case of the example in FIG. 3, a pixel 3C is the pixel being subjected to processing, and the hatched area is the reference area. The reference area shown in the figure is a square centered at the pixel being subjected to processing and having a predetermined size. The reference area includes pixels 2B to 2D, pixels 3B to 3D, and pixels 4B to 4D. Furthermore, in the processing using the modulation filter, the color information of the pixel being subjected to processing is converted on the basis of the color information of the pixels in the reference area. There are various methods for this conversion, and there is no particular limitation in this embodiment. Note that although the reference area shown in the figure is a square, the shape of the reference area is not limited to this shape.

Next, the settings that are determined by the determination unit 12 on a per-pixel basis will be described. The settings that are determined by the determination unit 12 are the degrees of conversion (e.g., the degrees of blurring or the degrees of bleeding) of the color information of the individual pixels. The degrees of modulation of an image are adjusted by adjusting the settings.

An example of a parameter for adjusting the degree of conversion of the color information of each pixel is the size of the reference area. The degree of blurring or the degree of bleeding increases and the degree of painting-likeness increases as the reference area becomes larger. Meanwhile, the degree of blurring or the degree of bleeding decreases and the degree of painting-likeness decreases as the reference area becomes smaller.

The determination unit 12 determines the size of the reference area that is set to each pixel on the basis of the distance information of that pixel and a predefined rule. The predefined rule may be a formula for calculating the size of the reference area from the distance indicated by the distance information, a table defining the relationship between the distance indicated by the distance information and the size of the reference area, etc.

The size of the reference area can be expressed, for example, in terms of the number of pixels. In this case, the size of the reference area that is determined by the determination unit 12 is greater than or equal to one pixel and less than or equal to M pixels. The value of M is an arbitrary value greater than 1.

Here, as an example of processing by the determination unit 12, the following describes processing in which the determination unit 12 determines the size of the reference area on a per-pixel basis on the basis of reference area information and distance information, where the reference area information defines the size of the reference areas on a per-level basis for N different levels (N is an integer greater than or equal to 2) of the distance from the camera.

FIG. 4 shows an example of reference area information defining the sizes of reference areas for the individual levels of the distance from the camera. The reference area information shown in the figure includes level numbers, distance ranges, thresholds, and formulas.

The level numbers are numbers individually assigned to a plurality of levels and serve as information for identifying the plurality of levels. N=5, i.e., the distance from the camera is divided into five levels. The distance ranges indicate the individual distance ranges of the plurality of levels, for example, in terms of upper limit values and lower limit values. The thresholds indicate the sizes of reference areas in the case where the distance is the greatest in the respective levels. The sizes of reference areas are expressed in terms of the numbers of pixels. The formulas are equations for calculating the sizes L of reference areas. An operator determines the value of N as well as the distance ranges, thresholds, and formulas for the individual levels, and registers reference area information including the determined content in the image processing device 10. Note that the specific examples of the value of N as well as the distance ranges, thresholds, and formulas for the individual levels, shown in the figure, are only examples, and there is no limitation to these examples.

Figure 5:
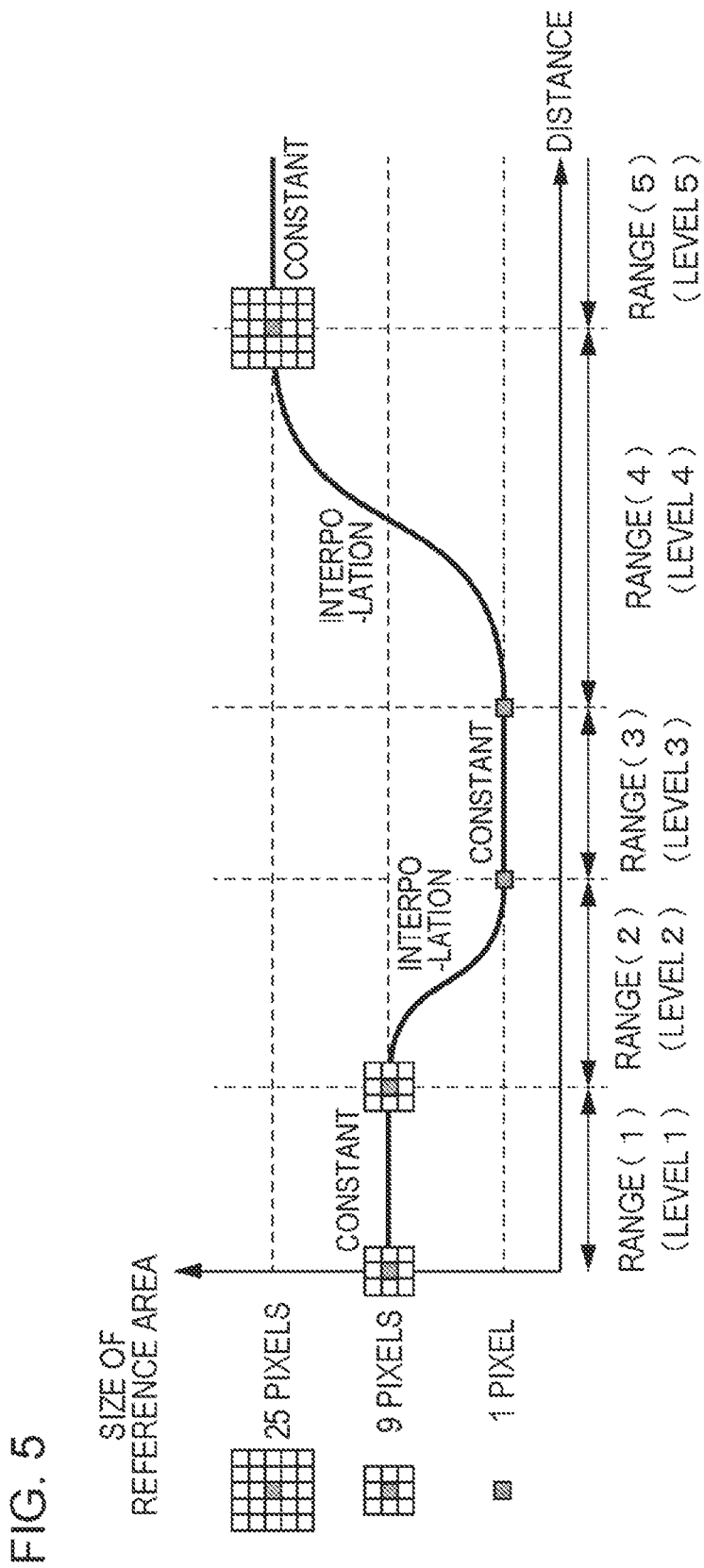
FIG. 5 shows content defined in the example of reference area information according to the present embodiment.

FIG. 5 shows the relationship between the distance from the camera and the size of the reference area as defined in the reference area information in FIG. 4. In the figure, the vertical axis indicates the size of the reference area, and the horizontal axis indicates the distance from the camera.

Since the threshold for level 1 is nine pixels according to FIG. 4, when the distance is the greatest in level 1 (at the boundary between level 1 and level 2), the size of the reference area is nine pixels, as shown in FIG. 5.

Furthermore, since the formula for the size L of the reference area in level 1 is L=(Threshold) according to FIG. 4, the size L of the reference area in level 1 is constantly nine pixels, as shown in FIG. 5.

Similarly, since the threshold for level 2 is one pixel according to FIG. 4, when the distance is the greatest in level 2 (at the boundary between level 2 and level 3), the size of the reference area is one pixel, as shown in FIG. 5. Furthermore, the formula for the size L of the reference area in level 2 is $L=f_1(d)$ according to FIG. 4. d is the distance from the camera as indicated by the distance information. The function $f_1(d)$ is a function generated by using an arbitrary interpolation method, such as Hermite interpolation, linear interpolation, Lagrange interpolation, or spline interpolation. A plurality of values (a plurality of pairs of d and L) that are given for the purpose of calculating the function by using these interpolation methods are determined by an operator. FIG. 5 shows a function curve in which the size of the reference area becomes smaller as the distance from the camera becomes longer.

Similarly, since the threshold for level 3 is one pixel according to FIG. 4, when the distance is the greatest in level 3 (at the boundary between level 3 and level 4), the size of the reference area is one pixel, as shown in FIG. 5. Furthermore, since the formula for the size L of the reference area in level 3 is L=(Threshold) according to FIG. 4, the size L of the reference area in level 3 is constantly one pixel, as shown in FIG. 5.

Similarly, since the threshold for level 4 is 25 pixels according to FIG. 4, when the distance is the greatest in level 4 (at the boundary between level 4 and level 5), the size of the reference area is 25 pixels, as shown in FIG. 5. Furthermore, the formula for the size L of the reference area in level 4 is $L=f_2(d)$ according to FIG. 4. The function $f_2(d)$ is a function generated by using an arbitrary interpolation method, such as Hermite interpolation, linear interpolation, Lagrange interpolation, or spline interpolation. A plurality of values (a plurality of pairs of d and L) that are given for the purpose of calculating the function by using these interpolation methods are determined by an operator. FIG. 5 shows a function curve in which the size of the reference area becomes larger as the distance from the camera becomes longer.

Similarly, since the threshold for level 5 is 25 pixels according to FIG. 4, when the distance is the greatest in level 5, the size of the reference area is 25 pixels, as shown in FIG. 5. Furthermore, since the formula for the size L of the reference area in level 5 is L=(Threshold) according to FIG. 4, the size L of the reference area in level 5 is constantly 25 pixels, as shown in FIG. 5.

Referring back to FIG. 2, the conversion unit 13 converts the color information on a per-pixel basis on the basis of the settings of the modulation filter (the sizes of reference areas) determined for the individual pixels by the determination unit 12. Specifically, for each pixel, the conversion unit 13 sets a reference area having the size determined by the determination unit 12, and converts the color information of that pixel on the basis of the color information of the other pixels in the reference area. For example, the conversion unit 13 sets a reference area for each pixel such that the relative positional relationship thereof with that pixel becomes a predefined positional relationship. The relative positional relationship is, for example, the relationship "each pixel is located at the center of the reference area thereof", but there is no limitation to this example. There is no particular limitation to the specific processing for the conversion of color information, and processing using the symmetric nearest neighbor (SNN) filter, the median filter, the Kuwahara filter, or the like may be employed.

Note that in the case where "one pixel" is set as the size of the reference area, the conversion unit 13 does not convert the color information of that pixel. That is, the color information corresponding to that pixel, acquired by the acquisition unit 11, serves as the color information of the pixel as is, even after the processing for modulating an image.

Figure 6:
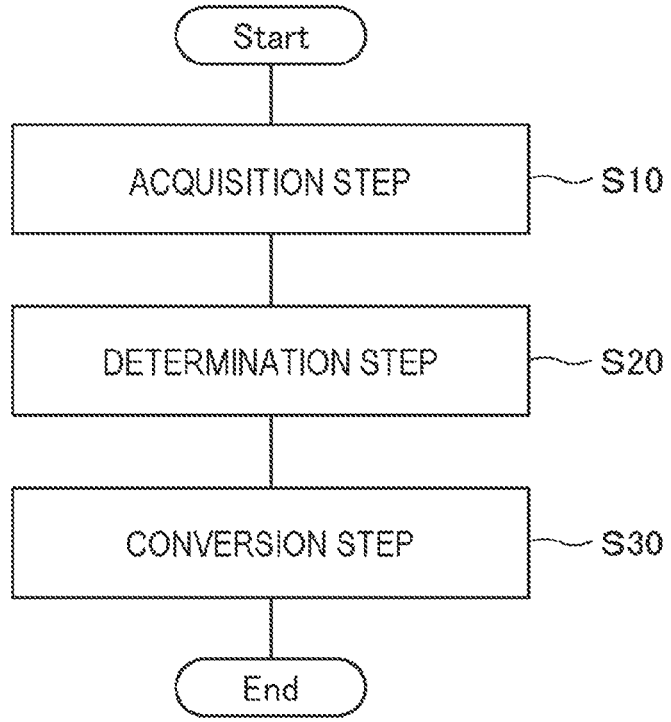
FIG. 6 is a flowchart showing an example flow of processing by the image processing device according to the present embodiment.

Next, an example of the flow of processing by the image processing device 10 according to this embodiment will be described with reference to a flowchart in FIG. 6.

First, the image processing device 10 acquires image information indicating, on a per-pixel basis, distance information indicating the distance from the camera and color information (acquisition step S10). For example, the image information is information concerning an image representing a scene in a game. The distance information, the color information, and the image have been described above in detail. For example, during a game, the image processing device 10 can acquire image information concerning an image representing a scene in that game before the image is output to a display or the like.

Figure 7:
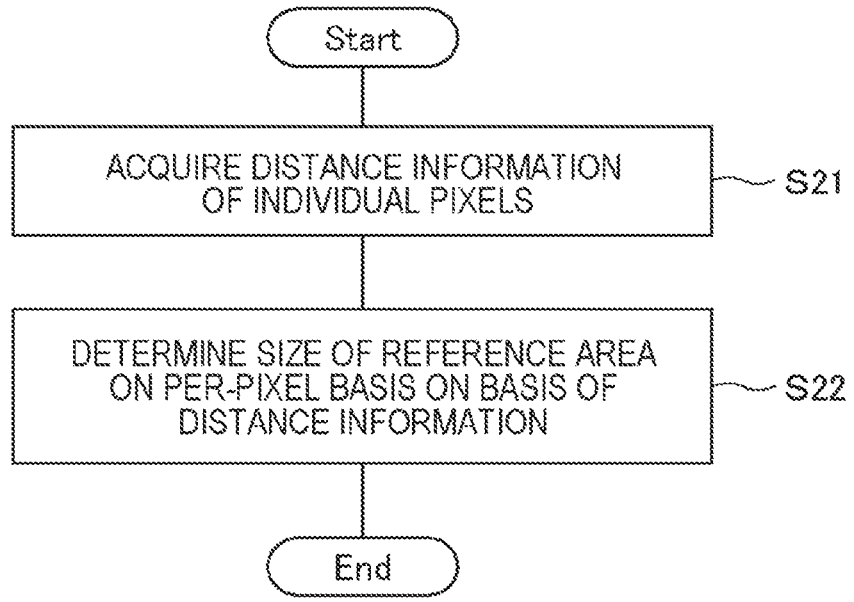
FIG. 7 is a flowchart showing an example flow of processing by the image processing device according to the present embodiment.

Then, the image processing device 10 determines the settings of the modulation filter that converts the color information of individual pixels to modulate an image into the style of a painting, on a per-pixel basis on the basis of the distance information of individual pixels (determination step S20). Specifically, as shown in a flowchart in FIG. 7, upon acquiring the distance information of individual pixels (S21), the image processing device 10 determines the size of the reference area for each pixel on the basis of the distance information (S22). For example, the image processing device 10 identifies the level whose distance range includes the distance indicated by the distance information with reference to the reference area information shown in FIG. 4. Then, the image processing device 10 determines the size L of the reference area on the basis of the formula for the identified level. The image processing device 10 can execute this processing on a per-pixel basis.

Figure 8:
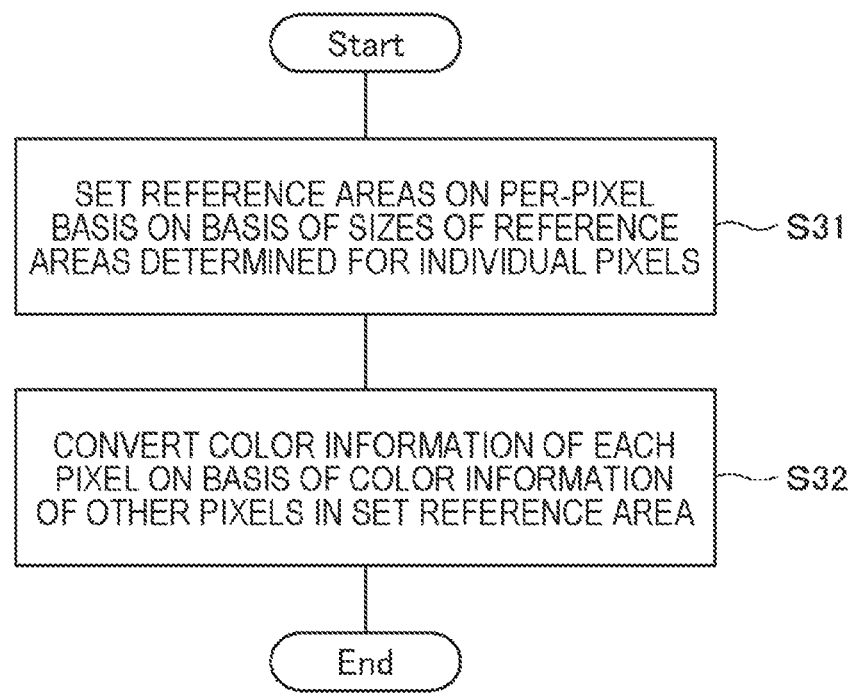
FIG. 8 is a flowchart showing an example flow of processing by the image processing device according to the present embodiment.

Referring back to FIG. 6, after the determination step S20, the image processing device 10 converts the color information on a per-pixel basis on the basis of the settings of the modulation filter (the sizes of reference areas) determined for the individual pixels in the determination step S20 (conversion step S30). Specifically, as shown in a flowchart in FIG. 8, the image processing device 10 sets reference areas on a per-pixel basis on the basis of the settings of the modulation filter (the sizes of reference areas) determined for the individual pixels in the determination step S20 (S31). For example, the image processing device 10 sets a reference area for each pixel such that the relative positional relationship thereof with that pixel becomes a predefined positional relationship. The relative positional relationship is, for example, the relationship in which "each pixel is located at the center of the reference area thereof", but there is no limitation to this example. Then, for each pixel, the image processing device 10 converts the color information on the basis of the color information of other pixels in the set reference area. There is no particular limitation to the specific processing for the conversion of color information, and processing using the symmetric nearest neighbor (SNN) filter, the median filter, the Kuwahara filter, or the like may be employed.

With the image processing device 10 described above, it is possible to set the degrees of conversion (e.g., the degrees of blurring or the degrees of bleeding) of the color information of individual pixels on a per-pixel basis and to convert the color information of the individual pixels as set on a per-pixel basis. Thus, with the image processing device 10, it is possible to vary the degrees of conversion partially within a single image. That is, with the image processing device 10, it is possible to generate a single image in which a portion with a high degree of conversion, a portion with a low degree of conversion, a portion that has not been converted, etc. coexist. Accordingly, with the image processing device according to this embodiment, it becomes possible to modulate an image into the style of a painting while realizing both edge clarity and painting-like qualities of predetermined content to be rendered.

Furthermore, with the image processing device 10 that executes modulation processing on the basis of the reference area information shown in FIGS. 4 and 5, it is possible to determine the sizes of reference areas having the following features and to execute processing for modulating an image accordingly.

(Feature 1) In the case where the distance indicated by the distance information is included in the distance range for level 3 (greater than or equal to D1 and less than or equal to D2), the size of the reference area is determined to be the size of each pixel (one pixel). That is, modulation into the style of a painting is not executed for an item to be rendered whose distance from the camera is included in the distance range.

(Feature 2) In the case where the distance indicated by the distance information is included in the distance range for level 4 (greater than D2), the reference area is determined so as to have a larger size as the distance indicated by the distance information becomes longer. That is, for an item to be rendered whose distance from the camera is included in the distance range, modulation is executed so as to increase the degree of painting-likeness as the distance from the camera becomes longer.

(Feature 3) In the case where the distance indicated by the distance information is included in the distance range for level 2 (less than D1), the reference area is determined so as to have a larger size as the distance indicated by the distance information becomes shorter. That is, for an item to be rendered whose distance from the camera is included in the distance range, modulation is executed so as to increase the degree of painting-likeness as the distance from the camera becomes shorter.

For example, the distance range for level 3 is a distance range in which focusing is possible. The distance range for level 4 is a distance range in which the distance from the viewpoint is too long for focusing and in which the degree of blurring increases as the distance becomes longer. Meanwhile, the distance range for level 2 is a distance range in which the distance from the viewpoint is too short for focusing and in which the degree of blurring increases as the distance becomes shorter. On the basis of the reference area information shown in FIGS. 4 and 5, the image processing device 10 can modulate an image similar to the way objects are actually seen. This makes it possible to generate a realistic image better reflecting the reality.

Now, a modification of the embodiment will be described. In the embodiment described above, the size of the reference area is adopted as a parameter for adjusting the degree of conversion of the color information of each pixel. As the parameter, the color difference or the like between pixels may be adopted instead of the size of the reference area. As the color difference increases, the degree of blurring or the degree of bleeding becomes higher, and the degree of painting-likeness increases. Meanwhile, as the color difference decreases, the degree of blurring or the degree of bleeding becomes lower, and the degree of painting-likeness decreases. Also with this modification, operations and advantages similar to those of the embodiment are realized.

Second Embodiment

Figure 9:
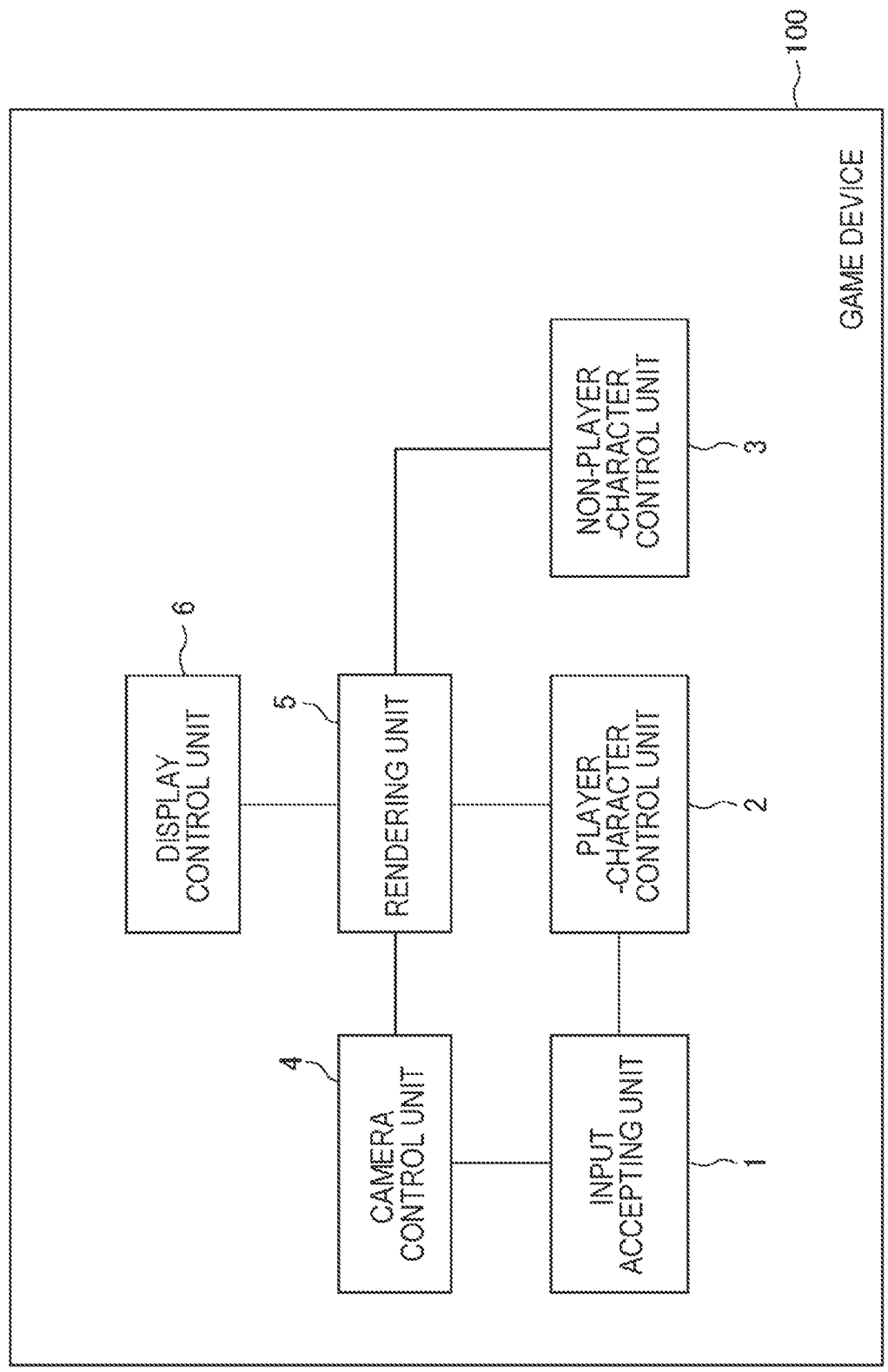
FIG. 9 is an example functional block diagram of a game device according to the present embodiment.

A game device according to this embodiment includes the functional units of the image processing device 10 described in the context of the first embodiment. FIG. 9 shows an example of the functional block diagram of the game device 100. As shown in the figure, the game device 100 includes an input accepting unit 1, a player-character control unit 2, a non-player-character control unit 3, a camera control unit 4, a rendering unit 5, and a display control unit 6. As will be described later in detail, the rendering unit 5 includes the functional units of the image processing device 10.

Note that in a game provided by the game device 100 according to this embodiment, a player character and a non-player character exist in a virtual three-dimensional space. The player character and the non-player character move through the virtual three-dimensional space and engage in battle with other characters or conversations with other characters. The virtual three-dimensional space is represented by an orthogonal coordinate system defined by the mutually orthogonal X axis, Y axis, and Z axis. Coordinates in the orthogonal coordinate system will hereinafter be referred to as "coordinates in the virtual three-dimensional space" depending on the case.

The input accepting unit 1 accepts operational inputs from the player. The input accepting unit 1 can accept operational inputs from the player via any input device, such as a game controller, a pointing device, a touchscreen, a physical button, a mouse, a keyboard, a microphone, or a camera. The specific content of operational inputs is a design matter that is defined on a per-game basis. For example, the player character performs an operational input for causing the player character to perform a predetermined action (e.g., movement).

The player-character control unit 2 controls the player character on the basis of operational inputs from the player. For example, the player-character control unit 2 manages the current position of the player character in the virtual three-dimensional space in the form of coordinates $(x_p, y_p, z_p)$ in the virtual three-dimensional space. Furthermore, the player-character control unit 2 manages the orientation (e.g., the facing direction) of the player character, for example, in the form of rotation angles $(\theta_{xp}, \theta_{yp}, \theta_{zp})$ about the X axis, the Y axis, and the Z axis with respect to a reference direction. Furthermore, on the basis of an operational input from the player, the player-character control unit 2 determines a new position and orientation of the player character in the virtual three-dimensional space and updates the coordinates $(x_p, y_p, z_p)$ and rotation angles $(\theta_{xp}, \theta_{yp}, \theta_{zp})$.

The non-player-character control unit 3 controls a non-player character. For example, the non-player-character control unit 3 manages the current position of the non-player character in the virtual three-dimensional space in the form of coordinates $(x_{np}, y_{np}, z_{np})$ in the virtual three-dimensional space. Furthermore, the non-player-character control unit 3 manages the orientation (e.g., the facing direction) of the non-player character, for example, in the form of rotation angles ($\theta_{xnp}$, $\theta_{ynp}$, $\theta_{znp}$) about the X axis, the Y axis, and the Z axis with respect to a reference direction. Furthermore, by using an arbitrary means (on the basis of a predetermined algorithm), the non-player-character control unit 3 determines a new position and orientation of the non-player character in the virtual three-dimensional space and updates the coordinates ($x_{np}$, $y_{np}$, $z_{np}$) and rotation angles ($\theta_{xnp}$, $\theta_{ynp}$, $\theta_{znp}$).

The camera control unit 4 controls the virtual camera located in the virtual three-dimensional space on the basis of an operational input from the player or a movement of the player character in the virtual three-dimensional space, arising from an operational input from the player. For example, the camera control unit 4 manages the current position of the virtual camera in the virtual three-dimensional space in the form of coordinates ($x_c$, $y_c$, $z_c$) in the virtual three-dimensional space. Furthermore, the camera control unit 4 manages the orientation (e.g., the direction of the optical axis) of the virtual camera, for example, in the form of rotation angles ($\theta_{xc}$, $\theta_{yc}$, $\theta_{zc}$) about the X axis, the Y axis, and the Z axis with respect to a reference direction. Furthermore, on the basis of an operational input from the player or a movement of the player character in the virtual three-dimensional space, arising from an operational input from the player, the camera control unit 4 determines a new position and orientation of the virtual camera in the virtual three-dimensional space and updates the coordinates ($x_c$, $y_c$, $z_c$) and rotation angles ($\theta_{xc}$, $\theta_{yc}$, $\theta_{zc}$).

There is no particular limitation to the method of determining the position and orientation of the virtual camera, and any technology may be adopted. For example, the virtual camera may be defined so as to photograph the player character from a position behind the character and separated by a predetermined distance. In this case, the camera control unit 4 can change the coordinates ($x_c$, $y_c$, $z_c$) indicating the current position and the rotation angles ($\theta_{xc}$, $\theta_{yc}$, $\theta_{zc}$) indicating the orientation of the virtual camera so as to follow changes in the coordinates ($x_p$, $y_p$, $z_p$) indicating the position and the rotation angles ($\theta_{xp}$, $\theta_{yp}$, $\theta_{zp}$) indicating the orientation of the player character. Note that although the photographing direction of the virtual camera is defined with reference to the player character in the above example, the photographing direction may be defined with respect to an object (e.g., a non-player character or an arbitrary object) different from the player character. Alternatively, the movement path or rotation direction of the virtual camera may be predefined. Furthermore, the camera control unit 4 may change the current position and orientation of the virtual camera according to the movement path or rotation direction.

The rendering unit 5 renders the three-dimensional space captured by the virtual camera as an image on a two-dimensional plane on the basis of the current position and orientation of the player character, managed by the player-character control unit 2, the current position and orientation of the non-player character, managed by the non-player-character control unit 3, and the current position and orientation of the virtual camera, managed by the camera control unit 4. Note that objects whose positions do not change (e.g., buildings and plants) may exist in the virtual three-dimensional space, and coordinates indicating the individual positions of the objects in the virtual three-dimensional space may be registered in advance. Furthermore, the rendering unit 5 may render the image on the two-dimensional plane by further using information concerning the objects.

Figure 10:
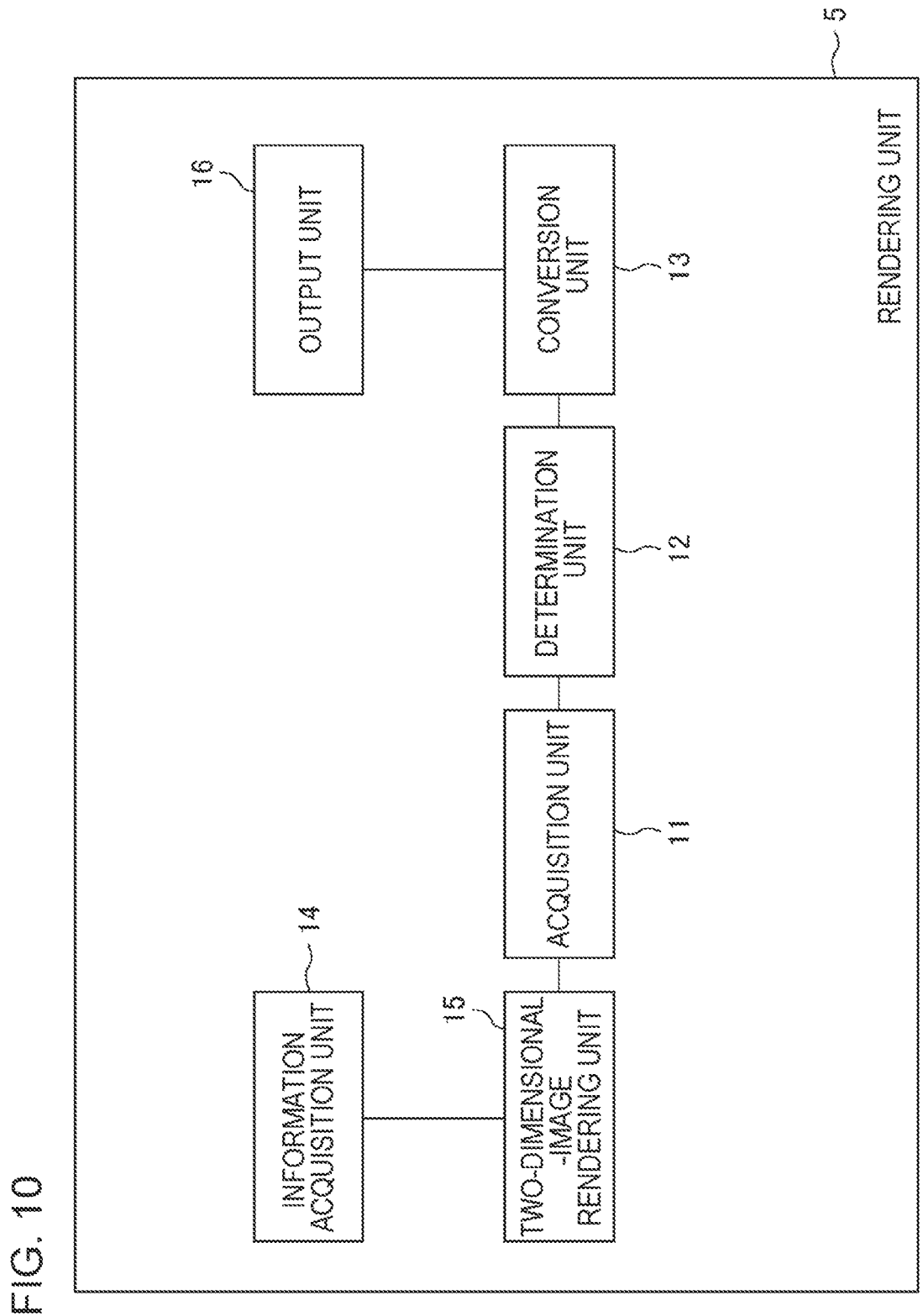
FIG. 10 is an example functional block diagram of a rendering unit according to the present embodiment.

As shown in FIG. 10, the rendering unit 5 includes an acquisition unit 11, a determination unit 12, a conversion unit 13, an information acquisition unit 14, a two-dimensional-image rendering unit 15, and an output unit 16.

The information acquisition unit 14 acquires information (e.g., the coordinates ($x_p$, $y_p$, $z_p$) and the rotation angles ($\theta_{xp}$, $\theta_{yp}$, $\theta_{zp}$)) indicating the current position and orientation of the player character, managed by the player-character control unit 2, information (e.g., the coordinates ($x_{np}$, $y_{np}$, $z_{np}$) and the rotation angles ($\theta_{xnp}$, $\theta_{ynp}$, $\theta_{znp}$)) indicating the current position and orientation of the non-player character, managed by the non-player-character control unit 3, and information (e.g., the coordinates ($x_c$, $y_c$, $z_c$) and the rotation angles ($\theta_{xc}$, $\theta_{yc}$, $\theta_{zc}$)) indicating the current position and orientation of the virtual camera, managed by the camera control unit 4. The information acquisition unit 14 may further acquire information indicating the positions and orientations of objects whose positions do not change. Furthermore, the information acquisition unit 14 may acquire information indicating the results of various game processing.

On the basis of the information acquired by the information acquisition unit 14, the two-dimensional-image rendering unit 15 renders the three-dimensional space captured by the virtual camera as an image on a two-dimensional plane. There is no particular limitation concerning the method of realizing this rendering, and any technology may be adopted. For example, the two-dimensional-image rendering unit 15 may execute preprocessing, such as coordinate transformation (world coordinate transformation or camera coordinate transformation), clipping processing, and geometric processing such as perspective transformation. Then, the two-dimensional-image rendering unit 15 may generate rendering data on the basis of the results of the preprocessing. The rendering data includes color data, texture coordinates, the coordinates of vertices on primitive faces, normal vectors, an a value, etc. Then, the two-dimensional-image rendering unit 15 generates image information concerning an image in which the player character, etc. after the perspective transformation are rendered on the basis of the rendering data. The image information indicates distance information indicating the distance from the virtual camera and color information on a per-pixel basis. Note that the two-dimensional-image rendering unit 15 can employ hidden surface removal processing using depth buffering (Z-buffering) or the like.

The acquisition unit 11, the determination unit 12, and the conversion unit 13 execute the processing described in the context of the first embodiment on the basis of the image information generated by the two-dimensional-image rendering unit 15.

The output unit 16 outputs image information indicating an image generated by the two-dimensional-image rendering unit 15 and subjected to modulation processing by the image processing device 10 (hereinafter referred to as image information after modulation processing).

Referring back to FIG. 9, the display control unit 6 displays the image indicated by the image information after modulation processing, output by the output unit 16 of the rendering unit 5, on an output device. Examples of the output device include a display and a projection device, but there is no limitation to these examples. The output device may be an external device that is physically and logically separated from the game device 100 and connected to the game device 100. Alternatively, the output device may be physically and logically integrated with the game device 100.

An example hardware configuration of the game device 100 is the same as the example hardware configuration of the image processing device 10 described in the context of the first embodiment.

With the game device 100 described above, operations and advantages similar to those of the image processing device 10 according to the first embodiment are realized.

Note that, as is apparent from the above description, the game device 100 renders a scene in the three-dimensional space each time, in which the situation constantly changes according to operational inputs from the player or under the control of the CPU, instead of rendering a still space that is constantly unchanged. Since the situation constantly changes, the relative positional relationship (distance and orientation) between the virtual camera and an item to be rendered (the player character, etc.) dynamically changes. Under such an environment in which the situation constantly changes, the game device 100 can render "the same item to be rendered" while emphasizing edges in some cases and in the style of a painting in other cases depending on the situation.

Examples of reference modes are appended below.

1. An image processing method,
   wherein a computer executes:
   an acquisition step of acquiring image information indicating, on a per-pixel basis, distance information indicating the distance from a camera and color information;
   a determination step of determining, on a per-pixel basis and on the basis of the distance information of individual pixels, settings of a modulation filter that converts the color information of the individual pixels to modulate an image into the style of a painting; and
   a conversion step of converting the color information on a per-pixel basis on the basis of the settings of the modulation filter determined for the individual pixels.

2. An image processing method according to 1,
   wherein the computer:
   in the conversion step, sets a reference area for each pixel and converts the color information of that pixel on the basis of the color information of the other pixels in the reference area; and
   in the determination step, determines the size of the reference area for each pixel on the basis of the distance information.

3. An image processing method according to 2,
   wherein the computer:
   in the determination step, determines the size of the reference area for each pixel on the basis of reference area information and the distance information, the reference area information defining the size of the reference area on a per-level basis for N different levels (N is an integer greater than or equal to two) of the distance from the camera.

4. An image processing method according to 3,
   wherein the computer:
   in the determination step, determines the size of the reference area for each pixel on the basis of the reference area information, which is a formula for calculating the size of the reference area.

5. An image processing method according to any of 2 to 4,
   wherein the computer,
   in the determination step,
   determines the size of each pixel as the size of the reference area in the case where the distance indicated by the distance information is included in a range greater than or equal to D1 and less than or equal to D2;
   determines the reference area such that the reference area becomes larger as the distance indicated by the distance information becomes longer in the case where the distance indicated by the distance information is greater than D2; and
   determines the reference area such that the reference area becomes larger as the distance indicated by the distance information becomes shorter in the case where the distance information is less than D1.

6. An image processing device including:
   an acquisition unit that acquires image information indicating, on a per-pixel basis, distance information indicating the distance from a camera and color information;
   a determination unit that determines, on a per-pixel basis and on the basis of the distance information of individual pixels, settings of a modulation filter that converts the color information of the individual pixels to modulate an image into the style of a painting; and
   a conversion unit that converts the color information on a per-pixel basis on the basis of the settings of the modulation filter determined for the individual pixels.

7. A program for causing a computer to function as:
   an acquisition means for acquiring image information indicating, on a per-pixel basis, distance information indicating the distance from a camera and color information;
   a determination means for determining, on a per-pixel basis and on the basis of the distance information of individual pixels, settings of a modulation filter that converts the color information of the individual pixels to modulate an image into the style of a painting; and
   a conversion means for converting the color information on a per-pixel basis on the basis of the settings of the modulation filter determined for the individual pixels.

8. A game device including:
   an input accepting unit that accepts an operational input from a player;
   a player-character control unit that manages the position and orientation of a player character in a virtual three-dimensional space;
   a non-player-character control unit that manages the position and orientation of a non-player character in the virtual three-dimensional space;
   a camera control unit that manages the position and orientation of a virtual camera in the virtual three-dimensional space;
   a rendering unit that renders the virtual three-dimensional space captured by the virtual camera as an image on a two-dimensional plane on the basis of the positions and orientations of the player character, the non-player character, and the virtual camera in the virtual three-dimensional space; and
   a display control unit that causes an output device to display the image on the two-dimensional plane,
   wherein the rendering unit includes:
   an acquisition unit that acquires image information indicating, on a per-pixel basis, distance information indicating the distance from the virtual camera and color information;
   a determination unit that determines, on a per-pixel basis and on the basis of the distance information of individual pixels, settings of a modulation filter that converts the color information of the individual pixels to modulate an image into the style of a painting; and a conversion unit that converts the color information on a per-pixel basis on the basis of the settings of the modulation filter determined for the individual pixels.

This application claims priority based on Japanese Patent Application No. 2018-241536 filed on Dec. 25, 2018, which is incorporated herein in its entirety.

The invention claimed is:

1. An image processing method,
wherein a computer executes:
an acquisition step of acquiring image information indicating, on a per-pixel basis, distance information indicating the distance from a camera and color information;
a determination step of determining, on a per-pixel basis and on the basis of the distance information of individual pixels, settings of a modulation filter that converts the color information of the individual pixels to modulate an image into the style of a painting; and
a conversion step of converting the color information on a per-pixel basis on the basis of the settings of the modulation filter determined for the individual pixels.

2. An image processing method according to claim 1,
wherein the computer:
in the conversion step, sets a reference area for each pixel and converts the color information of that pixel on the basis of the color information of the other pixels in the reference area; and
in the determination step, determines the size of the reference area for each pixel on the basis of the distance information.

3. An image processing method according to claim 2,
wherein the computer:
in the determination step, determines the size of the reference area for each pixel on the basis of reference area information and the distance information, the reference area information defining the size of the reference area on a per-level basis for N different levels (N is an integer greater than or equal to two) of the distance from the camera.

4. An image processing method according to claim 3,
wherein the computer:
in the determination step, determines the size of the reference area for each pixel on the basis of the reference area information, which is a formula for calculating the size of the reference area.

5. An image processing method according to of claim 2,
wherein the computer,
in the determination step,
determines the size of each pixel as the size of the reference area in the case where the distance indicated by the distance information is included in a distance range greater than or equal to a lower limit value and less than or equal to an upper limit value;
determines the reference area such that the reference area becomes larger as the distance indicated by the distance information becomes longer in the case where the distance indicated by the distance information is greater than the upper limit value; and
determines the reference area such that the reference area becomes larger as the distance indicated by the distance information becomes shorter in the case where the distance indicated by the distance information is less than the lower limit value, and wherein the upper limit value and the lower limit value correspond to a plurality of individual distances from the camera.

6. An image processing device comprising:
a processor; and
a memory coupled to the processor, wherein the memory comprises a program configured to perform a method comprising:
acquiring image information indicating, on a per-pixel basis, distance information indicating the distance from a camera and color information;
determining, on a per-pixel basis and on the basis of the distance information of individual pixels, settings of a modulation filter that converts the color information of the individual pixels to modulate an image into the style of a painting; and
converting the color information on a per-pixel basis on the basis of the settings of the modulation filter determined for the individual pixels.

7. A program for causing a computer to perform a method comprising:
acquiring image information indicating, on a per-pixel basis, distance information indicating the distance from a camera and color information;
determining, on a per-pixel basis and on the basis of the distance information of individual pixels, settings of a modulation filter that converts the color information of the individual pixels to modulate an image into the style of a painting; and
converting the color information on a per-pixel basis on the basis of the settings of the modulation filter determined for the individual pixels.

8. A game device comprising:
an input device that accepts an operational input from a player;
a processor coupled to the input device;
a memory coupled to the processor, wherein the memory comprises a program configured to perform a method comprising:
managing the position and orientation of a player character in a virtual three-dimensional space;
managing the position and orientation of a non-player character in the virtual three-dimensional space;
managing the position and orientation of a virtual camera in the virtual three-dimensional space;
rendering the virtual three-dimensional space captured by the virtual camera as an image on a two-dimensional plane on the basis of the positions and orientations of the player character, the non-player character, and the virtual camera in the virtual three-dimensional space; and
causing an output device to display the image on the two-dimensional plane,
wherein rendering the virtual three-dimensional space comprises:
acquiring image information indicating, on a per-pixel basis, distance information indicating the distance from the virtual camera and color information;
determining, on a per-pixel basis and on the basis of the distance information of individual pixels, settings of a modulation filter that converts the color information of the individual pixels to modulate an image into the style of a painting; and
converting the color information on a per-pixel basis on the basis of the settings of the modulation filter determined for the individual pixels.

* * * * *